Patented Aug. 18, 1925.

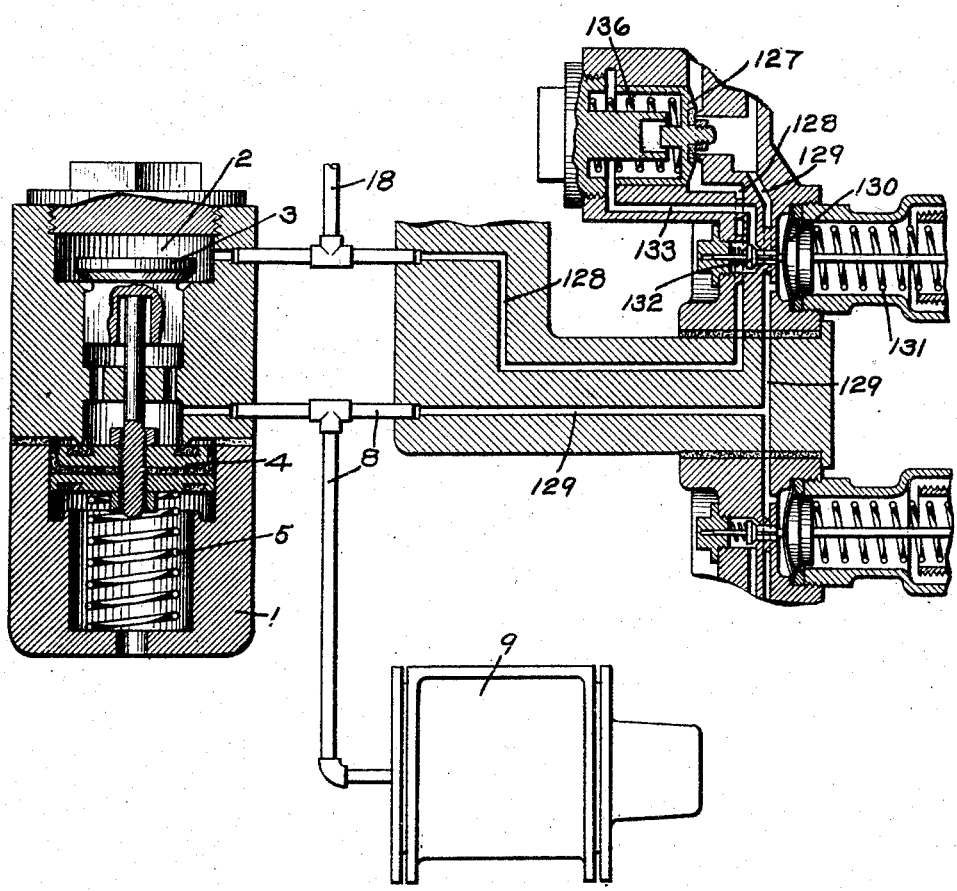

1,549,782

UNITED STATES PATENT OFFICE.

JOSEPH C. McCUNE, OF SOUTH ORANGE, NEW JERSEY, ASSIGNOR TO THE WESTINGHOUSE AIR BRAKE COMPANY, OF WILMERDING, PENNSYLVANIA, A CORPORATION OF PENNSYLVANIA.

FLUID-PRESSURE BRAKE.

Application filed September 30, 1924. Serial No. 740,759.

*To all whom it may concern:*

Be it known that I, JOSEPH C. McCUNE, a citizen of the United States, residing at South Orange, in the county of Essex and State of New Jersey, have invented new and useful Improvements in Fluid-Pressure Brakes, of which the following is a specification.

This invention relates to fluid pressure brakes, and more particularly to a brake equipment in which a limiting valve device is employed to limit the maximum degree of pressure of fluid supplied to the brake cylinder in applying the brakes, such as is the case in the equipment disclosed in prior Patent No. 1,265,001 of Walter V. Turner, dated May 7, 1918.

Where a maximum pressure limiting valve device is employed, there is some possibility that the limiting valve may fail and the principal object of my invention is to provide means for ensuring that a certain brake cylinder pressure will be obtained in the event that the limiting valve device should fail.

In the accompanying drawing, the single figure is a sectional view of a portion of a fluid pressure brake apparatus, showing my improvement applied thereto.

In order to illustrate one application of my invention, I have shown in the drawing the service pressure limiting valve portion as disclosed in the hereinbefore mentioned Patent No. 1,265,001, comprising a valve piston 127 for controlling communication from passage 128, through which fluid under pressure is supplied in applying the brakes, to a passage 129 which leads to brake cylinder pipe 8. A valve 132 controls communication from the spring chamber of the valve piston 127, by way of passage 133, to brake cylinder passage 129, and said valve is controlled by a diaphragm 130, subject on one side to the pressure of an adjustable regulating spring 131.

When an application of the brakes is made, fluid supplied by operation of the usual triple valve device flows to pipe 18 and thence through passage 128 to the face of valve piston 127, causing said valve piston to move from its seat, so that communication is opened from passage 128 to passage 129. Fluid under pressure is then supplied through pipe 8 to the brake cylinder 9 and when the pressure of fluid supplied, acting on diaphragm 130, slightly exceeds the pressure of spring 131, the diaphragm will be operated to permit the valve 132 to seat. This allows the fluid pressures to equalize on opposite sides of the valve pistons, permitting the spring 136 to move the valve piston to its seat, thus cutting off the further flow of fluid to the brake cylinder.

According to my invention, to ensure that fluid under pressure will be supplied to the brake cylinder in the event that the valve 132 should fail, a by-pass connection from the supply pipe 18 to the brake cylinder pipe 8 is provided. In said by-pass connection a valve device is interposed comprising a casing 1 having a valve chamber 2 containing a valve 3 for controlling communication from pipe 18 to pipe 8. For controlling the operation of valve 3, a piston 4 is provided, which is subject on one side to the pressure of fluid supplied to the brake cylinder and on the other side to the pressure of a coil spring 5, which is such that a predetermined minimum brake cylinder pressure, acting on the opposite side of the piston, will overcome the pressure of the spring.

In operation of my improvement, when fluid under pressure is supplied to pipe 18 in applying the brakes, fluid will flow from pipe 18 past the valve 3 to pipe 8 as well as to passage 128 and the pressure limiting valve device. When the brake cylinder pressure has been increased to the minimum pressure for which the spring 5 is adjusted, the piston 4 will be operated so as to permit the valve 3 to seat and thus cut off the further flow of fluid to the brake cylinder, as supplied through the by-pass connection. The limiting valve device will then act in the usual manner to limit the maximum pressure of fluid which may be supplied to the brake cylinder.

It will thus be evident that should the pressure limiting valve device fail to permit the supply of fluid to the brake cylinder, fluid under pressure will still be supplied to the brake cylinder, by way of the by-pass connection until the brake cylinder pressure has been increased to the minimum predetermined pressure for which the by-pass valve device is adjusted.

Having now described my invention, what I claim as new and desire to secure by Letters Patent, is:—

1. In a fluid pressure brake, the combination with a brake cylinder and a limiting valve device for limiting the maximum degree of pressure of fluid supplied to the brake cylinder, of a valve device for controlling a normally open by-pass connection through which fluid is supplied to the brake cylinder.

2. In a fluid pressure brake, the combination with a brake cylinder and a limiting valve device for limiting the maximum degree of pressure of fluid supplied to the brake cylinder, of a normally open by-pass connection through which fluid is supplied to the brake cylinder and a valve device for controlling communication through said by-pass connection.

3. In a fluid pressure brake, the combination with a brake cylinder and a limiting valve device for limiting the maximum degree of pressure of fluid supplied to the brake cylinder, of a valve for controlling a normally open by-pass connection through which fluid is supplied to the brake cylinder and a piston subject to the pressure of fluid supplied to the brake cylinder for controlling the operation of said valve.

4. In a fluid pressure brake, the combination with a brake cylinder and a limiting valve device for limiting the maximum degree of pressure of fluid supplied to the brake cylinder, of a valve for controlling a normally open by-pass connection through which fluid is supplied to the brake cylinder and a piston subject to the opposing pressures of the brake cylinder and a spring for controlling the operation of said valve.

5. In a fluid pressure brake, the combination with a brake cylinder and a limiting valve device for limiting the maximum degree of pressure of fluid supplied to the brake cylinder, of a valve for controlling a by-pass connection through which fluid is supplied to the brake cylinder and a piston subject to the opposing pressures of the brake cylinder and a spring and operated upon a predetermined increase in brake cylinder pressure for permitting said valve to close.

In testimony whereof I have hereunto set my hand.

JOSEPH C. McCUNE.